United States Patent
Suter

[11] 3,779,012
[45] Dec. 18, 1973

[54] ROCKET ENGINE
[75] Inventor: Xaver Suter, Thalwil, Switzerland
[73] Assignee: Werkzeugmaschinenfabrik Oerlikon-Buhrle AG, Zurich, Switzerland
[22] Filed: May 17, 1972
[21] Appl. No.: 254,083

[30] Foreign Application Priority Data
May 27, 1971 Switzerland.................... 7753/71

[52] U.S. Cl.................. 60/271, 60/201, 60/256, 244/3.22
[51] Int. Cl............................ F02k 1/00, F02k 9/02
[58] Field of Search................ 60/253, 255, 271, 60/267, 201, 256; 239/265.11; 244/3.22, 3.23; 102/49.3

[56] References Cited
UNITED STATES PATENTS

| 3,165,889 | 1/1965 | Kershner et al. | 244/3.22 |
| 3,147,591 | 9/1964 | McEwen | 244/3.22 |
| 2,944,389 | 7/1960 | Weinland | 60/201 |
| 3,520,139 | 7/1970 | Elkind et al. | 60/267 |
| 3,151,449 | 10/1964 | Manson | 60/267 |

Primary Examiner—Carlton R. Croyle
Assistant Examiner—Warren Olsen
Attorney—Werner W. Kleeman

[57] ABSTRACT

A rocket engine incorporating an extrusion molded-combustion chamber having a domed chamber floor with a substantially central cylindrical projection. A nozzle is retained in a bore at the combustion chamber floor. The bore is arranged eccentrically at the combustion chamber floor and a holding body means is secured to the central projection and serves to fix the nozzle in desired direction.

4 Claims, 2 Drawing Figures

PATENTED DEC 18 1973 3,779,012

3,779,012

ROCKET ENGINE

BACKGROUND OF THE INVENTION

The present invention broadly relates to the art of propulsion units and, more specifically, concerns a new and improved construction of rocket engine embodying an extrusion molded-cylindrical combustion chamber having a domed chamber floor with a central cylindrical projection, and a nozzle retained by means of a flange in a bore at the combustion chamber floor.

A known state-of-the-art construction of rocket engine of this general type proposes forming the combustion chamber floor and the projection of one-piece. The nozzle is arranged in a central bore of the projection and bears by means of a flange against the combustion chamber floor. If the combustion chamber is produced by extrusion molding and if the axis of the nozzle does not coincide with the axis of the combustion chamber, rather encloses an angle therewith, then it is not possible for the projection which houses the nozzle to be formed of one-piece or integrally with the combustion chamber. Welding and hard soldering are not suitable techniques for connecting the projection with the combustion chamber floor because the strength of the combustion chamber is at least locally impaired owing to the heating which thus occurs. Moreover, a satisfactory connection cannot be provided by threading the projection into a thin-walled floor.

SUMMARY OF THE INVENTION

Hence from what has been discussed above it should be apparent that this field of technology is still in need of a rocket engine which is not associated with the aforementioned drawbacks and limitations of the heretofore proposed constructions. It is therefore a primary object of the present invention to provide a new and improved construction of such rocket engine which effectively and reliably fulfills the existing need in the art and is not associated with the aforementioned drawbacks and limitations of the state-of-the-art proposals considered above.

Another and more specific object of the present invention resides in providing a secure and directionally stable support for a nozzle at a domed or arched combustion chamber floor of a rocket engine even if the axis of the nozzle does not coincide with the axis of the combustion chamber.

Now, in order to implement these and still further objects of the invention, which will become more readily apparent as the description proceeds, the invention contemplates arranging the bore eccentrically in the combustion chamber floor, and further, securing to the central projection a holding body or holding means which fixes the nozzle in the desired direction.

BRIEF DESCRIPTION OF THE DRAWING

The invention will be better understood and objects other than those set forth above, will become apparent when consideration is given to the following detailed description thereof. Such description makes reference to the annexed drawing wherein.

DETAILED DESCRIPTION OF THE PREFERRED EMBODIMENTS

Figure 1:
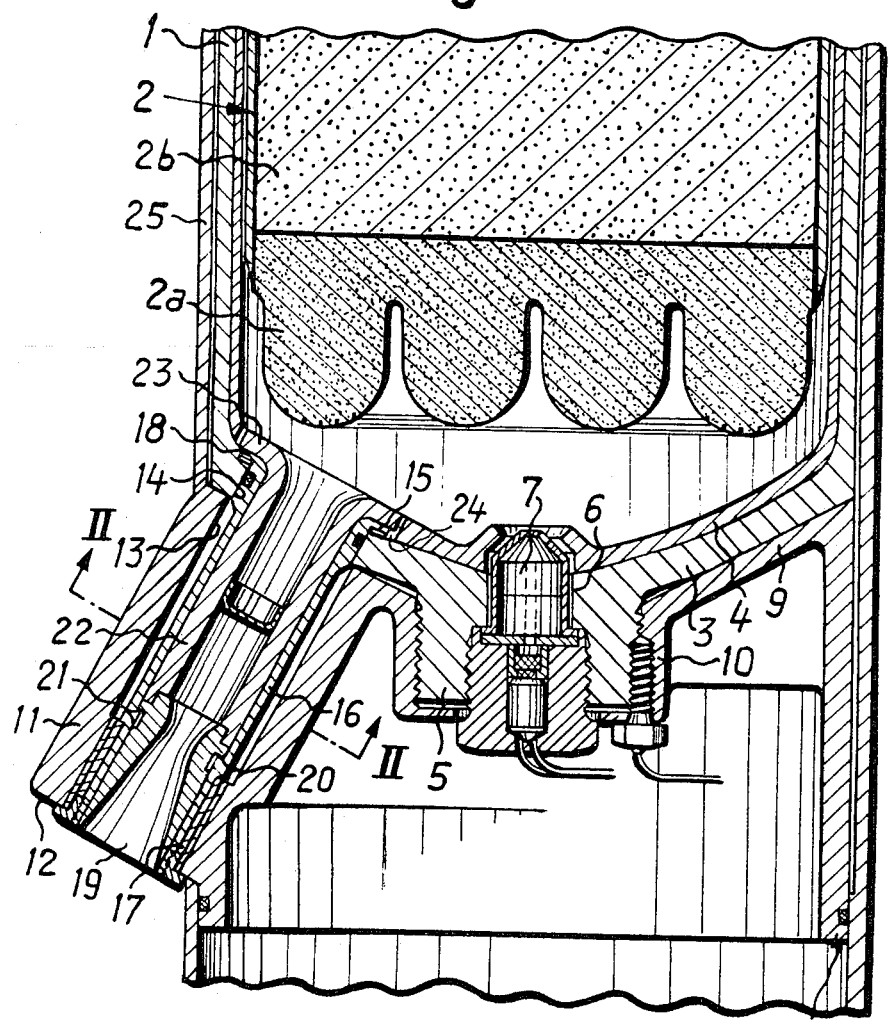
FIG. 1 is a fragmentary longitudinal sectional view through a rocket combustion chamber designed according to the teachings of the present invention.
Figure 2:
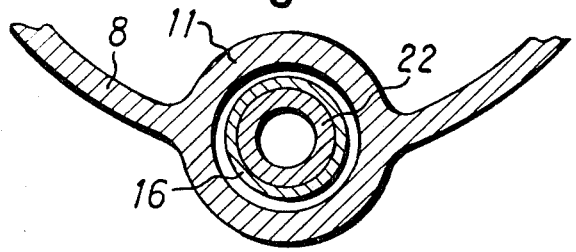
FIG. 2 is a cross-sectional view of the rocket engine depicted in FIG. 1, taken substantially along the line II—II thereof.

Describing now the drawing, in FIGS. 1 and 2 there is illustrated enough of a rocket engine containing the features of this invention to enable one versed in this particular art to readily understand the novel aspects of this development. Hence, it will be seen that a propellent charge body 2 is arranged in a substantially cylindrical combustion chamber or compartment 1 of the rocket engine. This combustion chamber 1 consists of a high-quality light-metal alloy, such as Perunal, and is fabricated by forging. The propellent charge body 2 is composed of two tandem arranged components, namely the starter component 2a with the enlarged surface and the sustainer or propulsion component 2b. As best seen by referring to FIG. 1 the combustion chamber floor 3 is designed such that its inner surface possesses a tapered or conical tip or crown having a large cone angle and a domed or arched transition portion which merges tangentially with the conical tip and the inner surface of the cylindrical portion of the combustion chamber 1. The outer surface of the chamber floor 3 is essentially tapered or conical. The combustion chamber 1 is internally lined with a suitable layer 4 of insulating material. Moreover, the combustion chamber floor 3 possesses a cylindrical projection 5, the axis of which coincides with the lengthwise axis of the combustion chamber 1. This projection or extension 5 is equipped with a bore 6 which continues at the floor and at the insulation layer 4. An ignition mechanism 7 for the propellent charge 2 is inserted into the bore 6 and extends into the combustion chamber 1.

There is also provided a sleeve member 8 consisting of phenolic resin filled with asbestos fibers. Such sleeve member 8 possesses an inwardly tapered or conically protruding floor 9 having a concentric sleeve-shaped projection 10. The projection 10 of the sleeve member 8 is threadably connected with the projection 5 of the combustion chamber floor 3. The sleeve bottom 9 bears against the combustion chamber floor 3. Furthermore, the sleeve member 8 has a substantially tubular-shaped extension or widened portion 11, the axis of which intersects the lengthwise axis of the combustion chamber 1 and encloses therewith an acute angle. The end face 12 of the widened portion or extension 11, and which end face is directed perpendicular to the axis of such extension or widened portion, is located externally of the sleeve member 8. The combustion chamber floor 3 possesses a circular opening or bore 14 which is coaxial with regard to a bore 13 of the extension or widened portion 11. The diameter of the bore or opening 14 and the bore 13 are essentially the same size. The inside of the combustion chamber floor 3 possesses a planar, substantially ring-shaped bearing surface 15 which is directed perpendicular to the axis of the bore or opening 14.

A sleeve 16 formed of steel is mounted in the bore 13 of the widened portion or extension 11. Sleeve 16 is centered in the bore or opening 14 and in a sleeve 17 secured in the bore 13 and bears through the agency of a flange or flange collar 18 against the surface 15 of the combustion chamber floor 3. A nozzle body 19 is inserted into the rear end of the sleeve member 16. This nozzle body 19 is secured against displacement towards the rear in that a flange or flange collar 20 bears against a shoulder or projection 21 of the bore of the sleeve member 16. A sleeve 22 formed of a thermally insulating material is arranged in the sleeve member 16 and extends with a flange or flange collar 23 covering the flange or flange collar 18 of the sleeve member 16 into an opening 24 of the insulation layer 4. This sleeve 22 protects the sleeve member 16, during the rather long combustion duration of the propellent charge 2, against the effects of the hot gases which flow therethrough.

The combustion chamber 1 is enclosed by a tube or conduit 25. Additional non-illustrated components for controlling the rocket propelled by the illustrated propulsion unit or power plant 1,2, are contained behind the combustion chamber 1 in the tubular member 25. These components are protected against the transfer of heat from the combustion chamber 1 by the floor 9 of the sleeve member 8.

While there is shown and described present preferred embodiments of the invention, it is to be distinctly understood that the invention is not limited thereto but may be otherwise variously embodied and practiced within the scope of the following claims. Accordingly,

What is claimed is:

1. A rocket engine comprising an extrusion molded substantially cylindrical combustion chamber having a domed chamber floor, said chamber floor being provided with a substantially central cylindrical projection, said combustion chamber floor being provided with a bore, a nozzle retained in said bore of said combustion chamber floor, said bore being arranged eccentrically at the combustion chamber floor, and holding body means secured to said central projection for fixing the nozzle in desired direction, said holding body means comprising a substantially sleeve-shaped projection threadably connected with said central projection of the combustion chamber floor.

2. A rocket engine comprising an extrusion molded substantially cylindrical combustion chamber having a domed chamber floor, said chamber floor being provided with a substantially central cylinder projection, said combustion chamber floor being provided with a bore, a nozzle retained in said bore of said combustion chamber floor, said bore being arranged eccentrically at the combustion chamber floor, and holding body means secured to said central projection for fixing the nozzle in desired direction, said holding body means possessing a floor accommodated to the combustion chamber floor, said floor of said holding body means having a substantially tubular-shaped projection, said bore of said combustion chamber floor and said tubular-shaped projection of said holding body being located along a common axis.

3. The rocket engine as defined in claim 2, wherein said nozzle is secured at said tubular-shaped projection.

4. The rocket engine as defined in claim 3, further including a sleeve member having a shoulder provided for said tubular-shaped projection, said nozzle having a flange collar engaging with said shoulder of said sleeve member to secure said nozzle towards the rear, a further sleeve member arranged in said first-mentioned sleeve member for retaining the nozzle in position at its front, both sleeve members having flange collar means and extending through the bore of the combustion chamber floor and bearing against such combustion chamber floor through the agency of said flange collar means.

* * * * *